(12) United States Patent
Kekez et al.

(10) Patent No.: US 7,218,016 B2
(45) Date of Patent: May 15, 2007

(54) EXPLOSIVELY DRIVEN RADIO FREQUENCY PULSE GENERATING APPARATUS

(76) Inventors: Mladen Marko Kekez, 2104 Alta Vista Drive, Ottawa, ON (CA) K1H 7L8; Daniel David Kekez, 2104 Alta Vista Drive, Ottawa, ON (CA) K1H 7L8

( * ) Notice: Subject to any disclaimer, the term of this patent is extended or adjusted under 35 U.S.C. 154(b) by 403 days.

(21) Appl. No.: 10/702,033

(22) Filed: Nov. 6, 2003

(65) Prior Publication Data
US 2005/0088044 A1   Apr. 28, 2005

(30) Foreign Application Priority Data
Oct. 28, 2003   (CA)   ................................. 2447094

(51) Int. Cl.
*H03K 3/00* (2006.01)
(52) U.S. Cl. ...................................... 307/108
(58) Field of Classification Search ................. 307/108
See application file for complete search history.

(56) References Cited

U.S. PATENT DOCUMENTS

| | | | |
|---|---|---|---|
| 2,555,305 A | | 6/1951 | Alty |
| 3,317,763 A | * | 5/1967 | Brumfield ..................... 310/11 |
| 3,579,111 A | | 5/1971 | Johannessen et al. |
| 4,482,816 A | | 11/1984 | Richardson et al. |
| 4,491,842 A | | 1/1985 | Gripshover et al. |
| 4,542,358 A | | 9/1985 | Boby |
| 4,862,021 A | | 8/1989 | LaRocca |
| 5,138,270 A | | 8/1992 | Nakata et al. |
| 5,301,362 A | * | 4/1994 | Ohkawa ....................... 455/98 |
| 5,650,681 A | | 7/1997 | DeLerno |

OTHER PUBLICATIONS

Thompson, James K., "Shock Electromechanical Energy Converter with Permanent Magnet", U.S. Statutory Invention Registration, Registration No. H148.*
Prischchepenko A.B., Shchelkachev M.V., "Dissipation and Diffusion Losses In A Spiral Explosive Magnetic Generator," Electichesvo, pp. 31-36, (1993).
Thomas A Holt, "Explosively-Driven Helical Magneto-Cummulative Generators,", (Jun. 2002).

* cited by examiner

Primary Examiner—Brian Sircus
Assistant Examiner—Dru Parries
(74) Attorney, Agent, or Firm—Jones, Tullar & Cooper, P.C.

(57) ABSTRACT

A device for generating an intense radio frequency pulse through use of a helical Magneto-Cumulative Generator (MCG). The MCG provides a chemical explosion and acts as a converter to transform the chemical/mechanical energy into an electrical energy impulse. Due to the detonation/combustion process, a vortex wake is produced which assumes the role of a quarter-wave trap/antenna. If the MCG is in high velocity flight, a bow-shaped shockwave, followed by a second shock front, is established around the head of the MCG, becoming a second antenna. Without flight, two MCG's are placed head-to-head so that the vortex wakes emit in opposite directions. Since the explosion destroys the MCG, a model is created to perform multiple tests of the ability of an MCG to act as an RF device.

10 Claims, 10 Drawing Sheets

EXPLOSIVELY DRIVEN RADIO FREQUENCY PULSE GENERATING APPARATUS

BACKGROUND OF THE INVENTION

1. Field of the Invention

The invention relates to a device that generates an intense radio frequency (RF) pulse. The primary source of energy is a chemical explosion, provided by a magneto-cumulative generator (MCG). The apparatus transforms the electrical pulse of the MCG into a powerful RF pulse.

2. Background Information

Attempts to create a device for generating high voltage pulses of short duration have resulted in several patents. One of the first patents on this topic was issued on Jun. 5, 1951 to R. L. Alty as U.S. Pat. No. 2,555,305, which teaches the use of a transmitter as a load, driven by a pulse generating circuit consisting of an inductor, a capacitor and a switch. Several other patents have issued since Alty's, with modifications on his basic idea. One such patent is U.S. Pat. No. 3,579,111 issued to Lexington et al on May 18, 1971. This more recent patent uses a tank circuit and a charging inductor to achieve resonance. The load is connected in series with the tank circuit. U.S. Pat. No. 4,491,842 issued on Jan. 1, 1985 to Gripshover et al shows yet another approach to generating high peak power, broadband radio frequency pulses. In this case, the generator is constructed with looped pairs of coaxial cables connected by spark gap switches. U.S. Pat. No. 4,482,816 issued on Nov. 13, 1984 to Richardson et al uses several pulse forming networks connected in parallel with a common double-sided printed circuit board to create a pulse circuit.

A more recent method of providing a power supply uses a magneto-cumulative generator (MCG) (A. D. Sakharov, Soviet Physics Uspekhi, vol. 9 No. 2, 1966, p. 294). The Magneto-Cumulative Generator (MCG) acts as a converter and transforms the chemical/mechanical energy of the explosion into an electrical energy impulse. MCG's have inherently low impedance and an energy density that is four to six orders of magnitude higher than traditional high voltage capacitors, while MCG's are also smaller in size than an equivalent electrically-driven system.

Several studies have been performed on the use of MCG's as power supplies in high-power RF devices. An important milestone in this field occurred with the 1993 disclosure of studies carried out in the Soviet Union by A. P. Prishchepenko and his colleagues (Prishchepenko A. B., Shchelkachev M. V., "Dissipation and Diffusion Losses in a Spiral Explosive Magnetic Generator", Electichesvo, No. 8, 1993, pp31–36). Another example is U.S. Pat. No. 4,862,021 issued on Aug. 29, 1989 to LaRocca wherein a system is taught that uses an MCG as a power supply. U.S. Pat. No. 5,650,681 issued on Jul. 22, 1997 to DeLerno has a similar purpose, but uses magnets and coils to generate an electrical current instead of an MCG.

FIG. 1, based on the work of Thomas Holt (Holt, Thomas A.; *Explosively-Driven Helical Magneto-Cumulative Generators*; Texas Tech University; June 2002.), shows a drawing of a helical MCG. The armature 10 contains a highly explosive chemical 12 that is ignited with the detonator 14 at the left side. The aluminum end piece 16 and the aluminum end plug 18 hold the armature 10 in place. The crowbar ring 22 prevents flux leakage before the explosion is complete. The sleeve 24 separates the aluminum end piece 16 and the armature 10 to ensure connectivity between a load 20 and a wire helix 26 located coaxial to the armature 10, supported by its own sleeve 28.

Before detonation, the wire helix is energized by an auxiliary pulsed power supply and the detonator 14 is ignited once the current in the helix 26 reaches its peak value. The explosion causes the armature 10 to expand radially, starting at the left nearest the detonator 14 and working axially towards the right. The expansion pushes the armature 10 out to touch the wire helix 26, shorting out the individual windings. The voltage applied to the helix must be high enough to enable spark discharges to form between the turns of the helix and enable a thermalization process to occur during which the spark discharges behave as a solid conductor and short circuit the turns of the helix. According to the principle of flux conservation, the initial and final magnetic flux in a system must be the same. When the volume between the helix 26 and the armature 10 is reduced by the expansion of the armature 10, the magnetic flux is compressed, causing an increase in current and, thus, inducing a voltage. The entire explosion happens quickly: the flux is compressed, the current is delivered to the load and the MCG breaks up into shrapnel. When the rate of expansion of the armature exceeds 1 km/s, a voltage pulse of up to 100 kV occurs.

A typical RF transmission system consists of a transmitter and an antenna. The transmitter may be viewed as a closed oscillatory circuit and the antenna is an open oscillatory circuit. Usually the transmitter and antenna must be connected via a transmission line, which becomes an extension of the closed oscillatory circuit. For maximum energy transfer, the output impedance of the transmitter must match the input impedance of the transmission line. Accordingly, the antenna and transmission line must also be matched—the impedance seen looking from the antenna terminals toward the transmission line must equal the conjugate of the antenna's impedance (the resistive components must be equal and the reactive components must be equal in amplitude, but opposite in sign). The radiation emitted from the oscillatory circuit always converges toward the lower frequencies because the resistive losses are smaller at those frequencies.

An impulse generator can also be used as a transmitter. The charge in the impulse generator can be viewed as a simple capacitor, transmission line and switch or as a capacitor, inductor and switch. An example of an impulse generator, a Marx generator, operates on the principle that a short, high voltage pulse can be created by charging a stack of parallel capacitors to a low voltage and then switching them in series. Other electrical pulsed power supplies that can be used include a Blumlein generator, an LC bank, an inductive storage/plasma opening switch or a Tesla transformer/storage transmission line. An electrical pulsed power supply can facilitate high operation of the RF radiating device (up to 1000 pulses/sec). Ten percent of the energy stored in the generator is converted into RF emissions for compact systems. For larger, electrically driven systems, the emitted RF radiations can exceed 1 GW with the efficiency of conversion exceeding 10%.

The use of delay lines or transmission lines for generating high voltage pulses is known from U.S. Pat. No. 5,138,270 issued to Nakata on Aug. 11, 1992. The prior art described in the patent connects a pulse forming network to a transmission line via a switching device. The transmission line is then connected to a load. The patent itself uses capacitors and inductors to represent characteristics of the circuit and replaces the pulse forming network with a Blumlein charge circuit. A preferred embodiment uses two parallel coaxial cables for the Blumlein charge circuit.

The modulation of energy from an oscillatory circuit is achieved with suitable antennas. If the antennas are absent, the RF energy available in the oscillatory circuit is wasted. The antenna can have any form, however not all forms are optimal for all frequencies. Optimization of the antenna will result in a higher efficiency and a better device.

A parasitic radiating circuit occurs when a radiating element that is not connected to the antenna affects the radiation pattern or impedance of the antenna. To reduce or eliminate the current in the parasitic radiating circuit, a quarter-wave trap can be provided. U.S. Pat. No. 4,542,358 issued on Sep. 17, 1985 to Boby uses a quarter-wave trap to protect a coaxial cable from high-powered, low frequency parasitic pulses. The quarter-wave trap consists of two microstrips arranged in parallel, separated by a dielectric substrate. The microstrips have a length that is a multiple of a quarter of the operational wavelength. It is important to reduce or eliminate parasitic currents in devices generating high voltage radio frequency pulses of short duration.

Provision of a device to generate high voltage radio frequency pulses is required. In the present invention, an MCG forms a transmitter to generate very high voltage RF pulses to disable computers, rather than merely forming the power supply for the transmitter. The conversion efficiency of chemical energy into electromagnetic energy reaches as high as 10% and the efficiency of RF generation from the electromagnetic energy pulse can reach 10%. A medium size helical MCG containing 0.5 to 2 kg of high energy explosive is able to supply power to generate an RF pulse of 10–40 kJ. If a smaller radiating device is required, the voltage impulse can be provided by an explosive piezo-generator containing 10–60 g of explosive. Classical explosive matter has a specific combustion energy on the order of $10^7$ Joules per kilogram of explosive. The magnetic energy density stored in the inductive accumulator or in the helix of an MCG can reach $4*10^5$ J per litre of volume. It has been observed that an RF pulse of such size is capable of causing damage to computers and digital electronic systems.

Thus, an MCG is a power source that can only be used once. In light of this fact, an equivalent circuit or model is required to perform multiple tests of the ability of an MCG to act as an RF device. Non-destructive testing of such a combination is required to determine operability. Explosively driven RF devices operate on the same principle as electrically driven RF devices, except a chemical explosion is used as the primary source of energy. The MCG behaves as a converter to transform the chemical/mechanical energy of the explosion into a magnetic energy impulse. A combination of opening and closing switches cause the transfer of magnetic energy into an electrical energy impulse that energizes an oscillatory circuit. MCG's are advantageous because they have inherently low impedance and are smaller than electrically driven systems.

SUMMARY OF THE INVENTION

The present invention uses an MCG to create high frequency pulses of short duration. The physical device of the present invention comprises a helical MCG, which generates high voltage impulses due to the compressed magnetic flux inside the MCG. The helix of the MCG with its inner conducting tube has the function of an RF oscillatory circuit. A capacitor is connected via its leads between the final turn of the helix and an insulating end cap of the MCG. These leads function as a delay line which has the function of an RF oscillatory circuit. The vortex wake arising from the detonation and combustion processes assumes the function of a quarter-wave trap/antenna. If the MCG is in high velocity flight, a bow-shaped shock wave, followed by a second shock front will be established around the head of the MCG. These shock waves provide the primary antenna. When the MCG is stationary, the physical dimension of a coupling capacitor provided in the oscillatory circuit will produce the primary antenna. Alternatively, two MCG's can be joined head to head and ignited at the same time to produce the primary and quarter-wave trap antennas. The primary antenna and the quarter-wave trap antenna are capable of supplying spherical transverse electromagnetic (TEM) waves.

Operability of the device can be confirmed through non-destructive testing. A classical electrical pulsed power capacitor supply models the function of the MCG. The final RF data must be scaled because the internal impedance of the electrical pulsed power capacitor is very high in comparison to that of the MCG and the energy density of the capacitors is five to six orders of magnitude smaller than the explosives. The model used for non-destructive testing of the present invention comprises a combination of opening-closing switches transferring energy from the inductive accumulator or helix into the oscillatory circuit. Antennas are attached at each end of the model circuit to permit the transfer of RF energy from the circuit into the surrounding.

The present invention relates to an explosively driven Radio Frequency (RF) pulse-generating device that comprises a helical Magneto-Cumulative Generator (MCG) and a capacitor connecting a turn of the helix of the MCG to an end cap of the MCG. Detonation of the MCG produces hydrocarbon byproducts that form a vortex wake, which becomes an antenna with a conical-shaped structure that emits an RF pulse.

The present invention relates to an explosively driven Radio Frequency (RF) pulse-generating device that comprises a Helical Magneto-Cumulative Generator (MCG). Detonation of the MCG produces hydrocarbon byproducts that form a vortex wake, which forms an antenna with a conical-shaped structure. The vortex wake emits an RF pulse at a tail end of the MCG and, upon flight, bow-shaped shockwaves create an RF pulse at a head end of the MCG, whereby the head end is at an opposite end of the MCG to the tail end.

Frame A. Conditions as in FIG. 6, except that $C_A$=10 nF

Frame B. Conditions as in frame A, except that $C_A$=100 pF.

Figure 8:
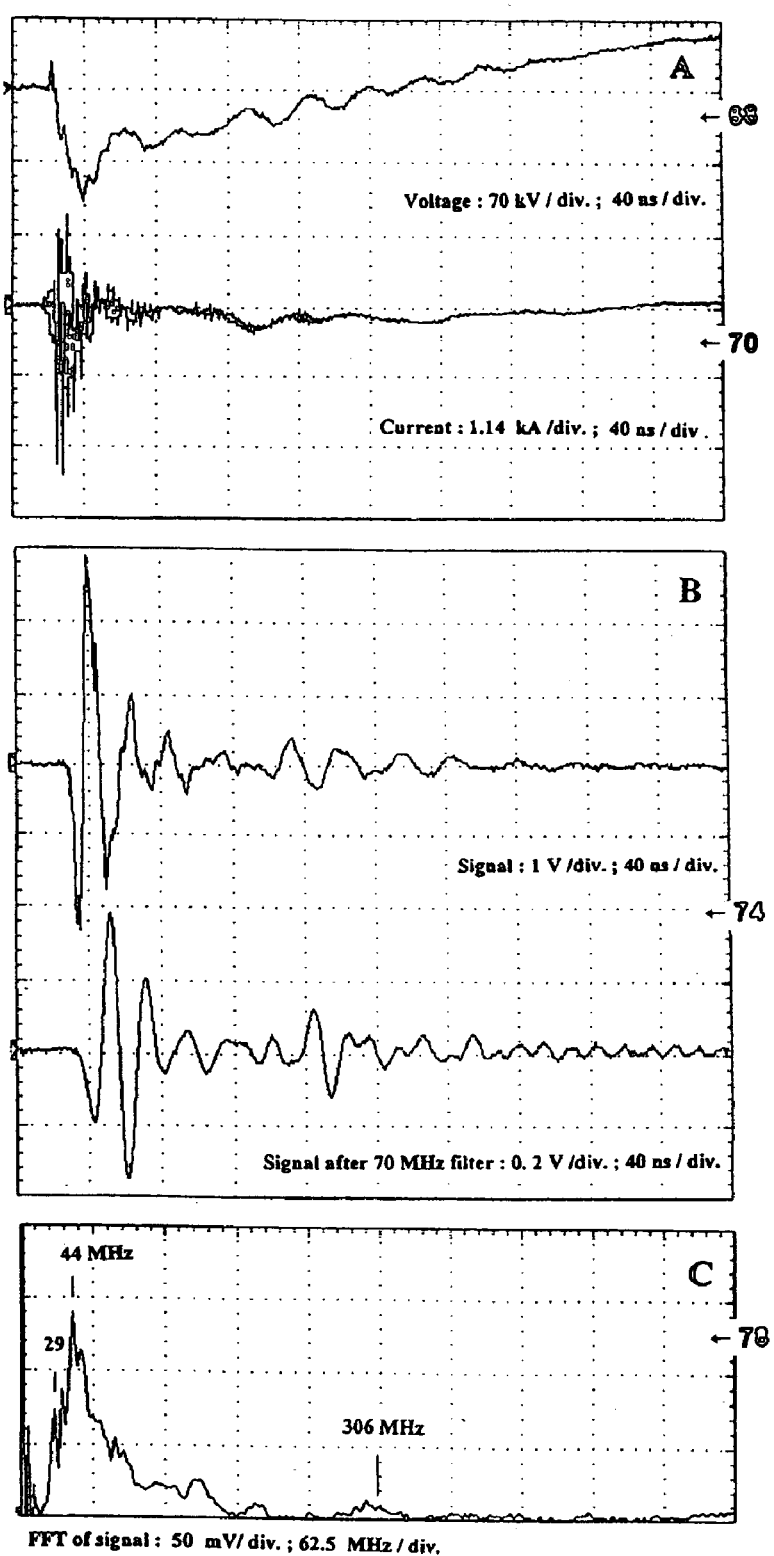

FIG. 8 shows experimental data obtained using the helix in which corona type breakdown occurs between the turns of the helix.

Figure 9:
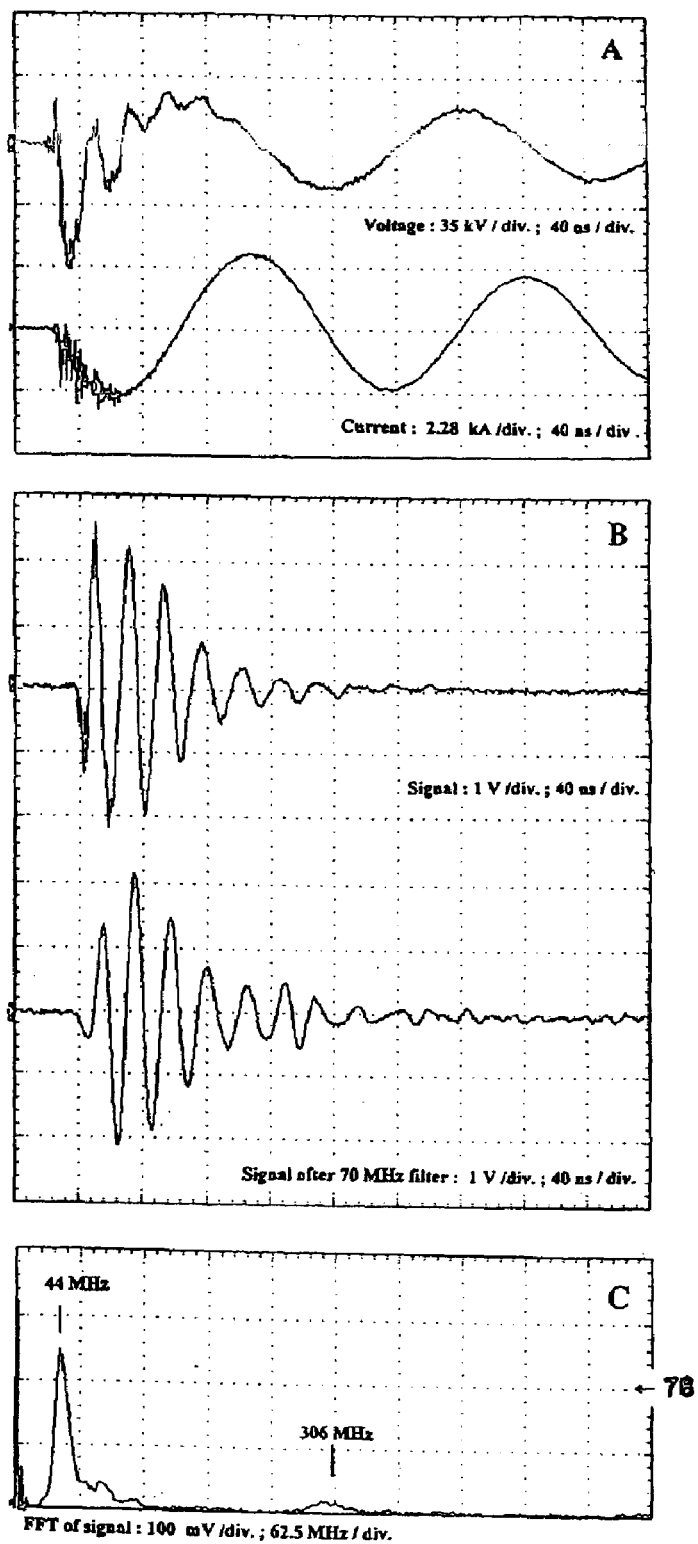

FIG. 9 shows experimental data with conditions as in FIG. 8 except that the spark type breakdown has taken place between the turns of the helix.

Figure 10:
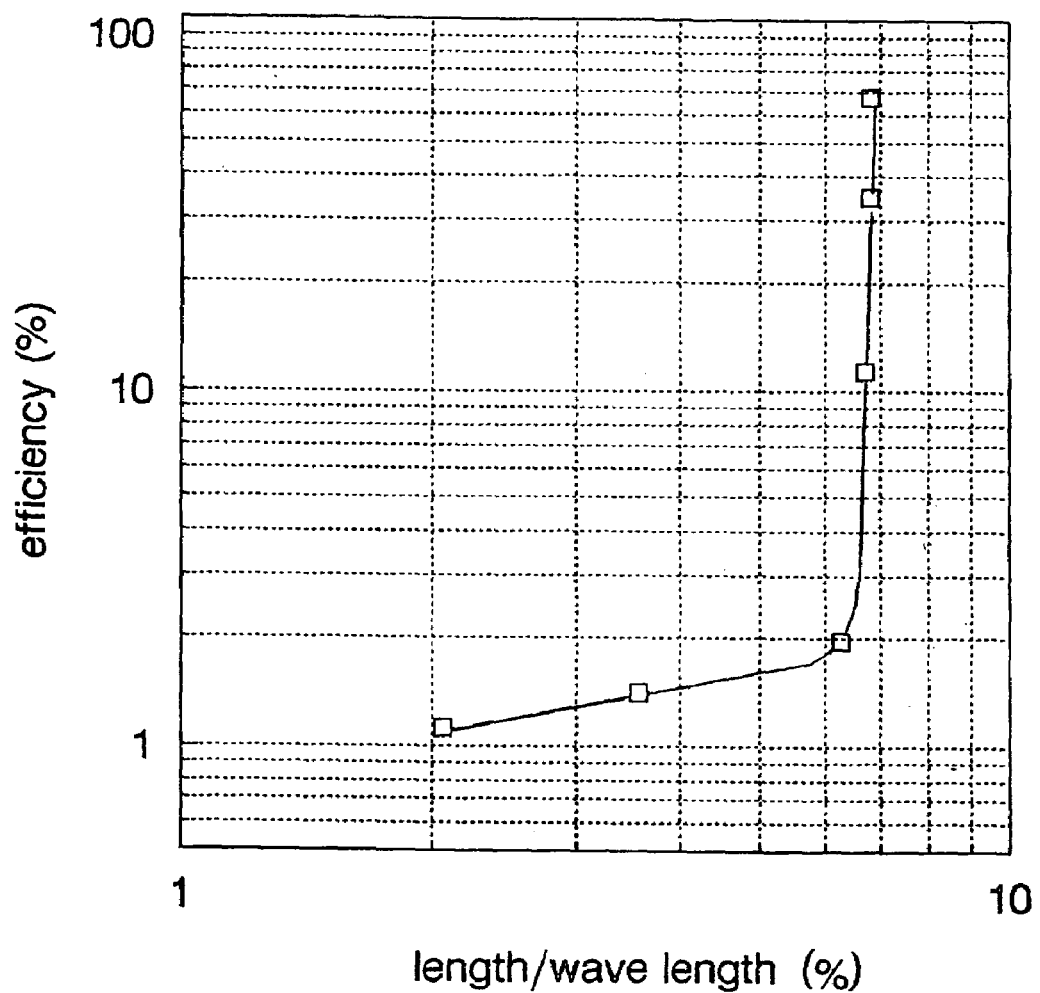

FIG. 10 shows the efficiency of the system vs. the normalized length of the antenna.

DESCRIPTION OF THE PREFERRED EMBODIMENT

Figure 1:
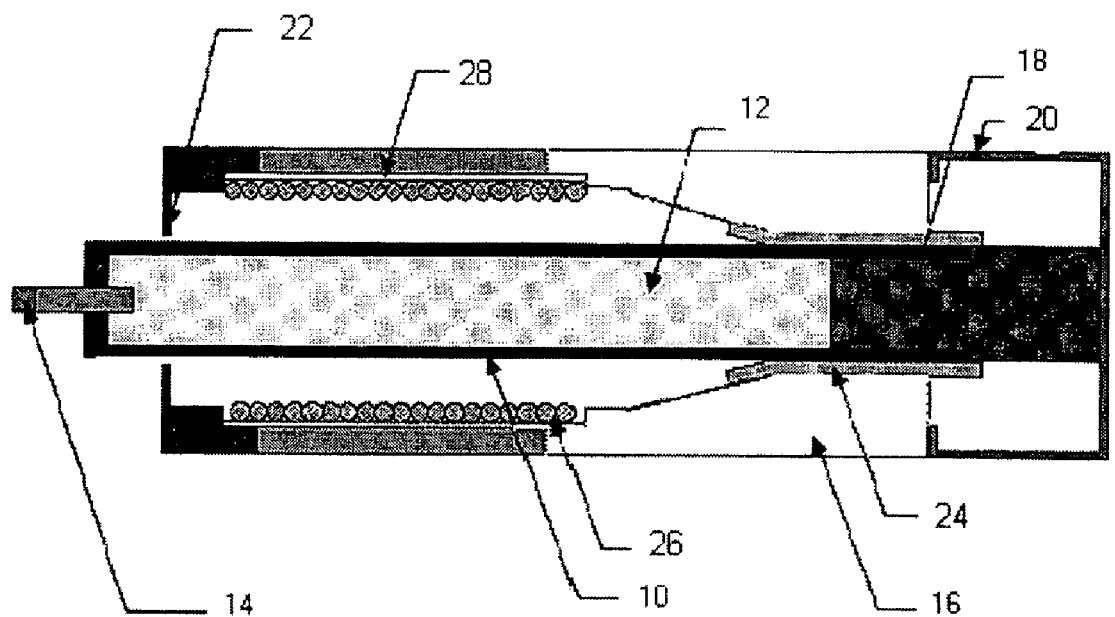
FIG. 1 shows an MCG of Prior Art.
Figure 2:
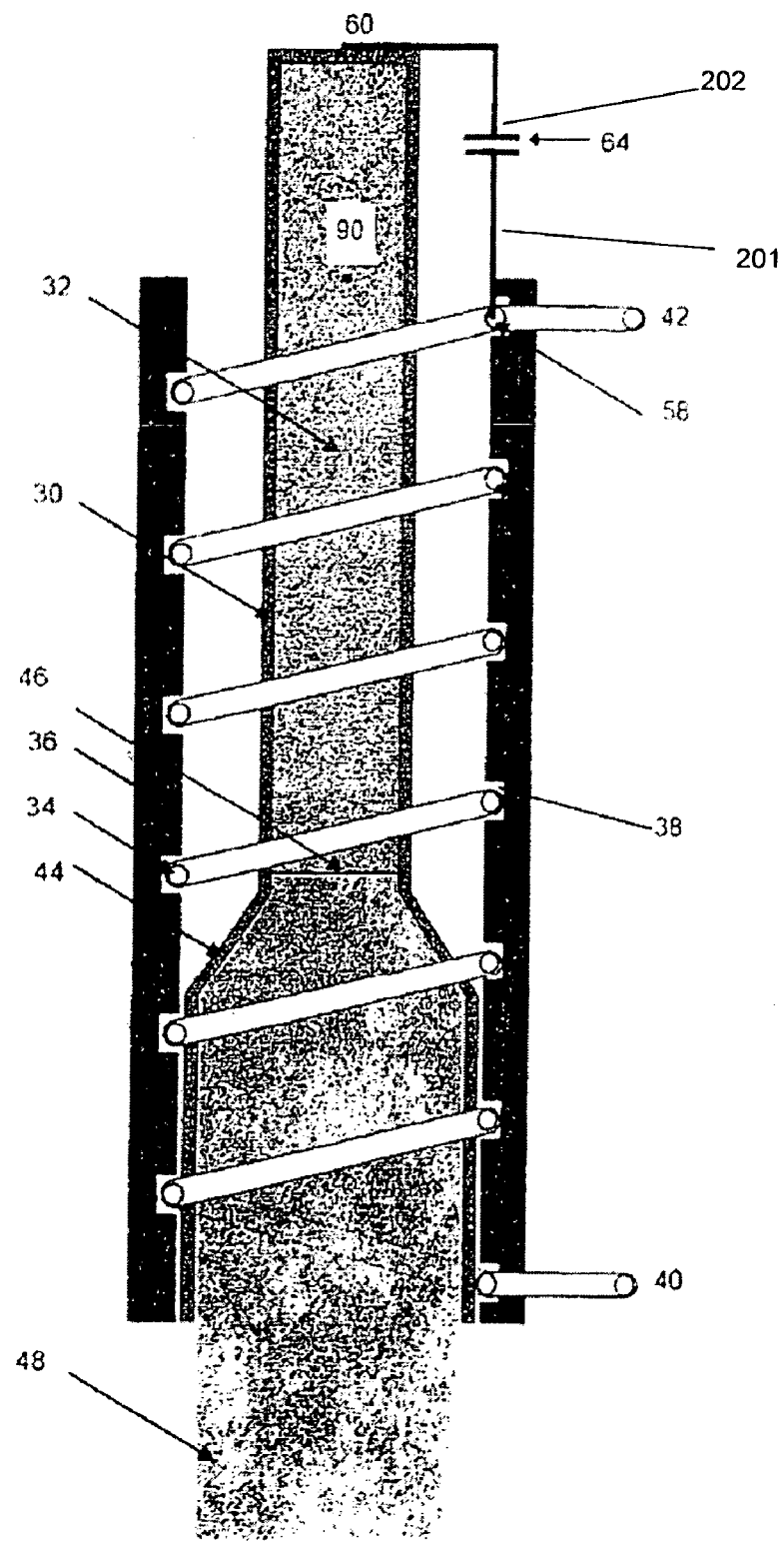
FIG. 2 shows a diagram of the MCG of the present invention.

The helical MCG device of the present invention shown in FIG. 2 consists of an inner conductive tube 30 containing explosive charge 32 and a helix 34 surrounding the tube. A fibre-epoxy overcast 36 is placed on top of the helix. The overcast is not present in slots 38 provided along the longitudinal length of the helix. The width of each slot is a few millimetres.

The helix is primed by the auxiliary pulsed power supply attached to points 40 and 42. When the magnetic field in the helix reaches a peak value, the explosive is ignited at the bottom of the tube 30 causing the tube 30 to stretch and form a cone 44. The detonation wave 46 propagates through explosive charge and "moves" the cone upwards. The byproducts of detonation (and combustion) processes exit in the form of a vortex wake 48.

The chemical energy of the explosives is converted into the mechanical energy of the moving cone, which compresses the magnetic flux and contributes to the increase of the magnetic energy. The helix wire 34 at the slot 38 may have a decreased cross-sectional area (e.g. the wire is pinched) so that the passage of current of appropriate intensity and duration will make this cross-section heat rapidly and begin to vaporize. During this process its resistance increases rapidly, acting as an electrical open switch. When the wire explodes, the current I flowing through the helix will be interrupted, inducing a voltage impulse, V, across the opening switch:

$$V = M \frac{L \delta I}{\delta t} \quad (1)$$

where L is the inductance of the helix from the point 34 to 42 and M is the material parameter that takes into account the hydrodynamic process during the current interruption in the time interval, δt. Generally, M is less than one. The voltage impulse will attempt to re-establish contact across the fuse. However, experiments show that the voltage impulse tends to create a new path. If, at this moment, the geometry of the MCG is that of FIG. 2, the spark breakdown will take place between the pinched wire at point 38 and the tube 30, close to point 44. This spark breakdown performs the function of a closing switch.

As the cone travels from point 40 to point 42, the process described above repeats throughout the length of the helix. To optimize the design, a specially designed fuse in the helix's structure can be introduced to replace the reduction of the diameter of the wire at the pre-set positions.

The quarter-wave (λ/4) trap assumes the function of a radiating antenna and is formed by the vortex wake. The vortex wake arises from the hydrocarbon (detonation) byproducts and forms a cone-like structure. These hydrocarbon byproducts must have sufficient electrical conductivity over a certain time interval. In one embodiment, low ionization materials, such as potassium, are added to the explosive material to prolong the lifetime of (combustion/detonation) plasma and ensure that the antenna/λ/4 trap (vortex wake) is of sufficient size and length. If the hydrocarbon byproducts are relatively cold (i.e. the electrical conductivity is poor) the explosively driven RF sources will yield a low emission. If the antenna/λ/4 trap is not long enough, lower frequencies cannot be extracted. Theoretical and experimental work shows that the antenna/λ/4 trap enhances the total energy stored in the system. The antenna/λ/4 trap in conjunction with an additional antenna at the top 60 may also act as an additional reservoir of energy.

An antenna is needed to enable the RF energy to be transferred from the circuit into space. This primary antenna is formed at the opposite side of the explosive capsule's ignitor, where a capacitor $C_A$ 64 is provided. If the optimum value of $C_A$ is used, the characteristics of this structure can be obtained from literature, also known as a short emitting antenna (oscillating monopole). If the MCG is subject to high velocity flight, a bow-shaped shock wave is established around the head of the MCG, forming an antenna. If particles of low ionization potential are deposited on the outside of the MCG during flight, the conductivity of the bow-shaped shock wave will increase. Alternatively, the byproducts of the detonation/combustion process can also form the primary antenna by joining two MCG's in a cascade, or head to head, so that the combined MCG's will have ignition capsules on both ends or by providing a plain tube with an explosive charge placed at the head of MCG. In both cases, the explosive charges are to be ignited at the same time. To extract the energy at low (20–60 MHz) frequencies, the minimum linear dimension of the primary antenna should be more than 20% of the wavelength, λ. For high (100–500 MHz) frequencies, the length should be comparable to that of the λ/4 trap. If the antennas are arranged to form biconical antennas, a wide frequency band of RF energy will be transmitted to the surrounding.

To obtain a maximum voltage impulse, an opening switch can be provided and optimized through numerical analysis of the energy stored in the inductor at the beginning of wire vaporization and the energy consumed for wire vaporization. When the switch is opened, its resistance must be much larger compared to the impedance of the load (delay lines). Long exploding wire with a small cross-section can be used as a fuse to offer effective energy transfer from an inductive reservoir into load. The long exploding wire can also be used as the first turn in the helix structure.

Figure 3:
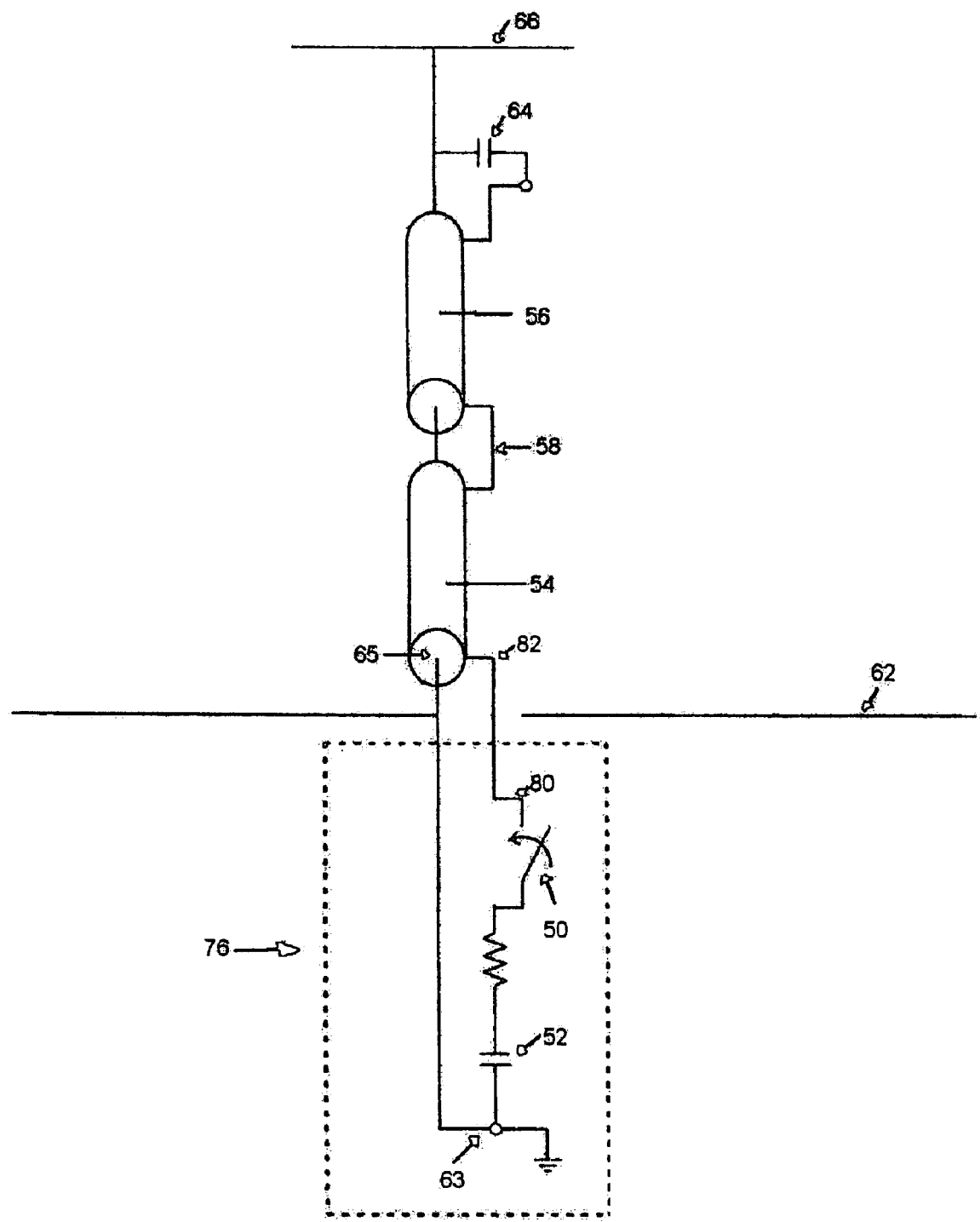
FIG. 3 shows a schematic view of an RF generator with antennas.

These processes are represented by the equivalent circuit of FIG. 3. The closing switch 50 and the capacitor $C_G$ 52 charged to voltage V create the voltage impulse. When the closing switch 50 is closed, the voltage impulse is transferred into delay lines $T_1$ 54 and $T_2$ 56 and the outer conductor (braiding) of the delay lines is at potential V. The braiding forms an additional line of impedance Z, which radiates the energy available in T1 and $T_2$. The position of the antenna 66 at the far end of the delay lines determines where the radiation is emitted. The antenna/trap 62 and the primary antenna 66 define the oscillating cavity, analogous to two mirrors encompassing a laser. If $C_A$ 64 is present and it has a diameter of 5–10 cm, antenna 66 may not be necessary, as its role will be assumed by $C_A$. Capacitor $C_A$ 64 can be included to limit the value of the current flowing through the delay lines, i.e. a decrease in $C_A$ decreases the current. Also, at the beginning of the impulse, $C_A$ is charged by the incoming voltage, V, and behaves as an energy bank. Later in the process, $C_A$ is discharged to sustain the radiation emitted by $T_1$ and $T_2$. Such dual functions indicate that maximum radiation will occur at a so-called "optimum" value of $C_A$.

Figure 7:
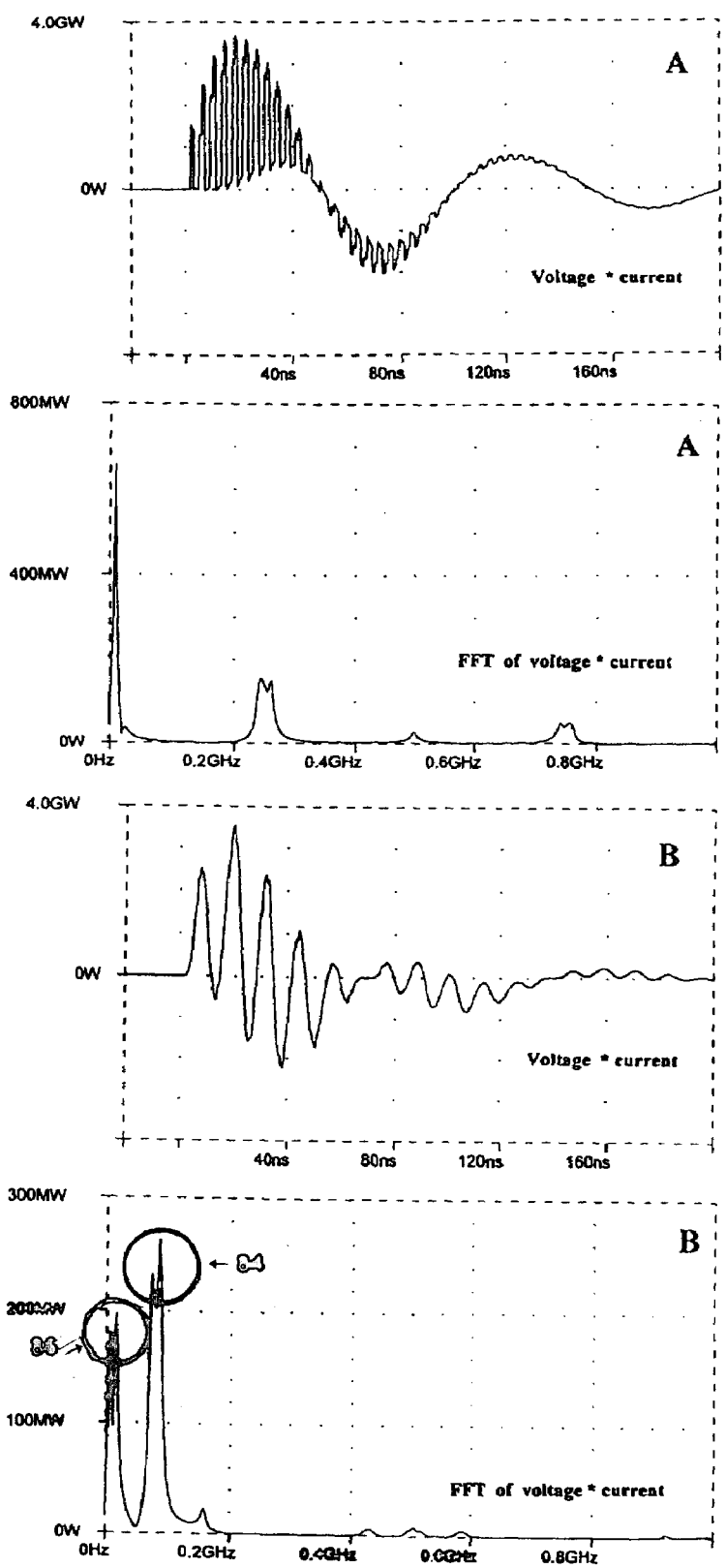
FIG. 7 shows computer simulations of the available power and its FFT

Delay line $T_1$ 54 represents the tube 30 and the part of the helix from point 44 to 58 of FIG. 2. At both high and low frequencies, this section is treated as a solid line due to the capacitance coupling between the turns of the helix, and is confirmed by the test results of FIGS. 7 and 8. Delay line $T_2$ 56 represents the loop between points 42 and 60, and comprises first and second capacitor leads 201 and 202. The delay line(s) generate an RF pulse. The vortex wake 48 of FIG. 2 is the antenna/trap 62 in FIG. 3. The end 63 of the shielded impulse generator 76 is equivalent to point 44 in FIG. 2, while the end 65 of $T_1$ represents point 46 in FIG. 2.

The resistive component, R of the line, Z is estimated using the expression of an oscillating monopole also known in literature as a short antenna:

$$R = 80\pi^2 \left(\frac{l}{\lambda}\right)^2 \quad (2)$$

where l is the overall length of $T_1$ plus $T_2$ and $\lambda$ is the wavelength of the emitted radiation. Eq (2) is valid if $l<<\lambda$. If I is the current through the impedance Z, the power radiated is:

$$P = \frac{RI^2}{2} = 40\pi^2\left(\frac{l}{\lambda}\right)^2 I^2 \quad (3)$$

The emitted radiation at the frequency f is related to $T_1+T_2$ as:

$$f = \frac{1}{2(T_1 + T_2)} \quad (4)$$

For $T_1+T_2=2$ ns, f becomes 250 MHz. Following the method given in the earlier invention, the upper envelope of available power in the oscillatory circuit is approximated as:

$$P(t)=I(t)V(t)=I_oV_oxe^{-x} \quad (5)$$

Here, x is the normalized time and is equal to $2\pi n/[(fR_G)(C_GC_A/C_G+C_A)]$ and n is an integer equal to the number of reflections (i.e., oscillations on the voltage waveform).

Figure 4:
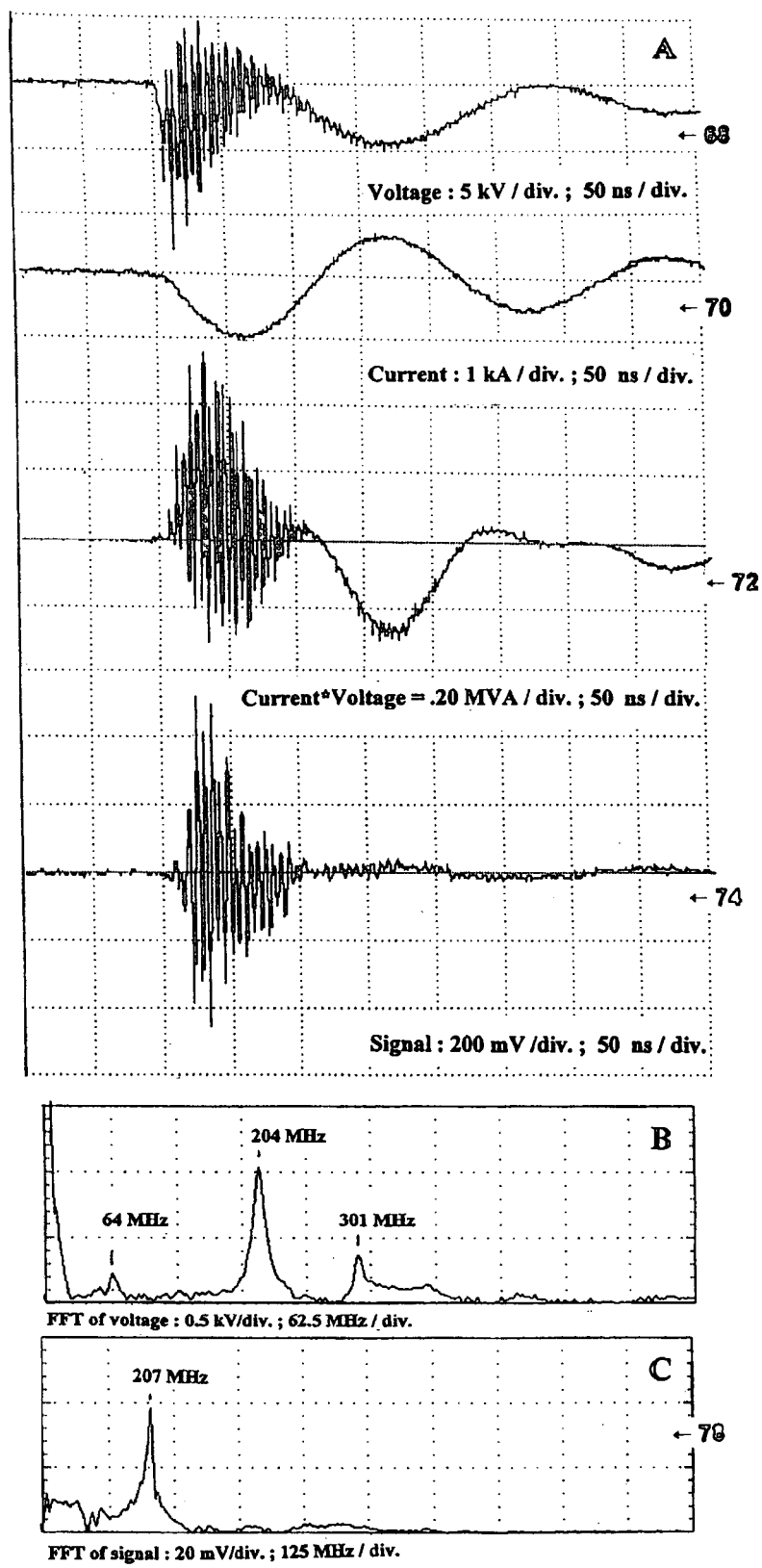
FIG. 4 shows experimental data for the schematic given in FIG. 3 with $C_G$=8 nF, V=15 kV, $Z_D$=50 Ω, $C_A$=4.8 nF, $T_1+T_2$=2.5 ns and $T_1$=$T_2$.
Figure 5:
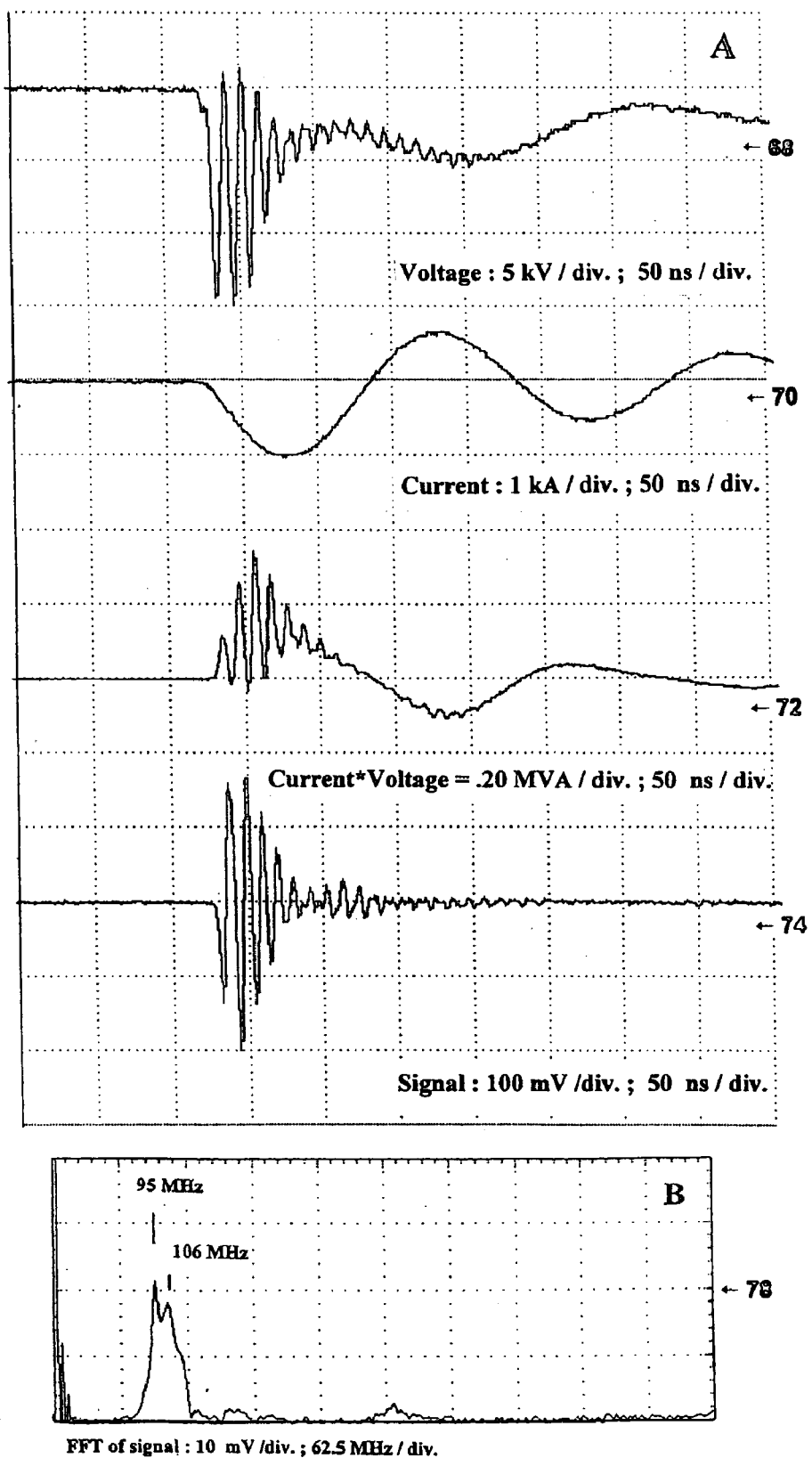
FIG. 5 shows experimental data for conditions as in FIG. 4, except that the position of the antenna/λ/4 trap is placed below the impulse generator shown in FIG. 3.

The experimental verification of the proposed concept is given in FIGS. 4 and 5. The voltage 68 and current 70 waveforms were measured and the product of voltage times current 72 derived. The emitted radiation signal 74 measured with a D-dot probe is also given. FIGS. 4 and 5 show the results of two different signals applied to the circuit of FIG. 3.

The data given in FIG. 4 is generated with a small opening for delay line $T_1$ and a shielded impulse generator 76. In this case, $T_1$, $T_2$ and $C_A$ constitute the oscillatory circuit and the impulse generator merely supports the radiation set by $T_1$, $T_2$ and $C_A$.

The data in FIG. 5 is generated with a large opening between the antenna/trap and $T_1$. This allows the switch of the impulse generator to dictate the frequency of oscillation, while $T_1$, $T_2$ and $C_A$ behave as an amplifier for the system.

In FIG. 4, the emitted frequency 78 is 207 MHz, whereas in FIG. 5, it is shown to be 95 MHz.

Moving the antenna/trap towards the impulse generator by a few centimeters causes the frequency of FIG. 4 to fall by 6% to the nominal value of 190 MHz (not shown). Similarly, moving the antenna/trap away from the impulse generator, will increase the frequency. The position of the antenna/trap also governs the waveform of the voltage times current.

Additional tests have demonstrated that the radiation emitted from the oscillatory circuit converges toward lower frequencies (or longer wavelength $\lambda$), because the resistance, R of Eq (2) is smaller at these longer wavelengths. Initially, the frequency emitted will be high, however, as the available energy in the oscillating circuit approaches a maximum value, the emitted frequency will change from for example 200 MHz to 95 MHz.

To further support Eqs. 2 and 3, the current, I, entering the antenna/trap was measured. The experimental conditions were that of FIG. 5 with an optimum value of $C_A$. It was found that the waveform of $I^2$, is in good agreement with the waveform of the power density of the radiation, recorded by the D-dot probe. This data is similar to the waveform of the energy available in the oscillatory circuit. Therefore, R of Eq. 2 can be considered to be a constant number.

Computer simulations can be generated by the method given in a copending application by M. M. Kekez and D. D. Kekez, "Radio Frequency Pulse Generating Apparatus". The conclusions reached therein remain valid even though the two inventions differ slightly since the present invention includes the impedance of the antenna 62, R, given by Eq. (2) between points 80 and 82 of FIG. 3.

Figure 6:
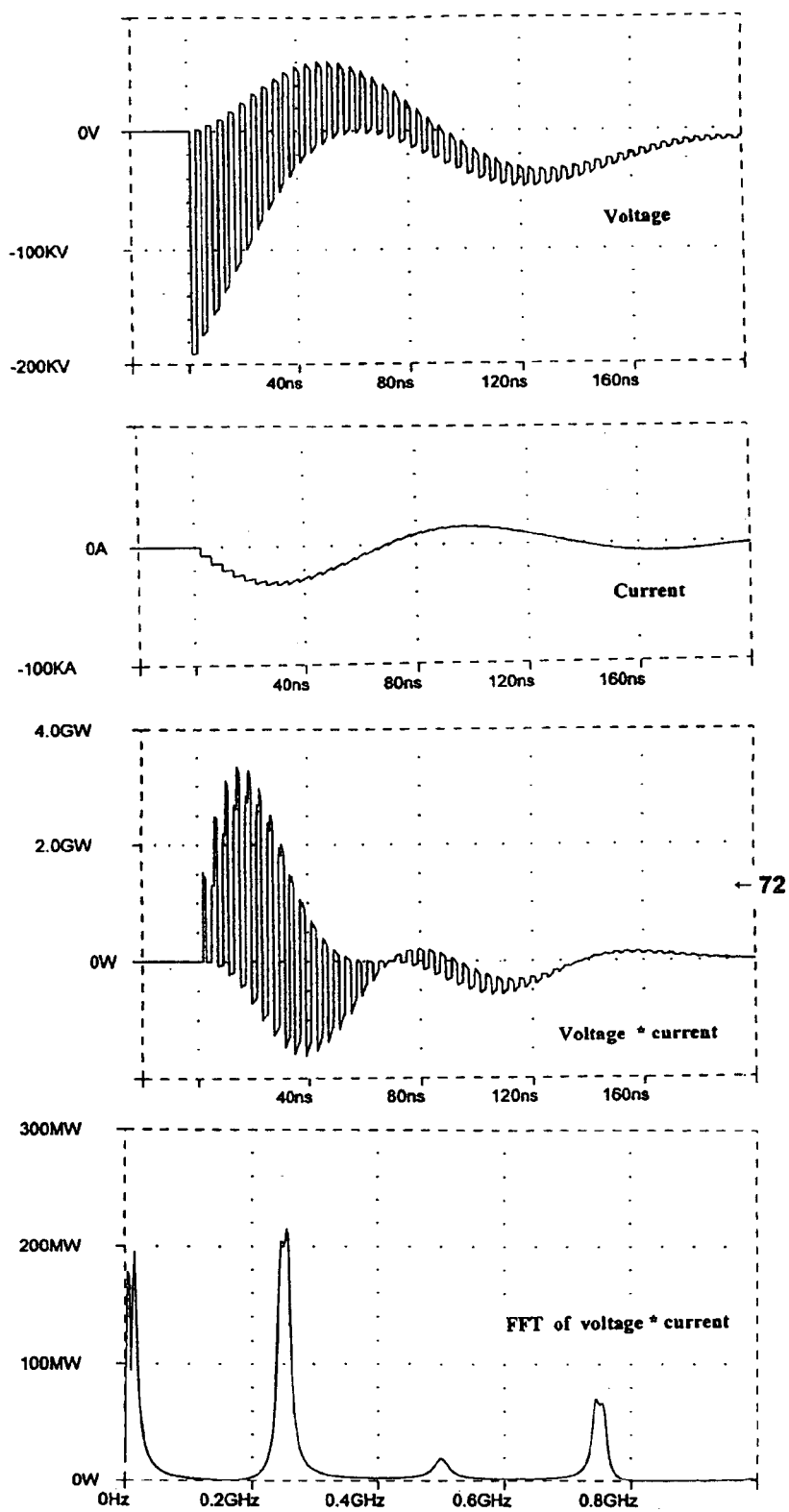
FIG. 6 shows computer simulations of voltage, current, available power, and FFT of available power in the delay lines with: $C_G$=10 nF, $R_G$=0.1 Ω, V=200 kV, $Z_D$=50 Ω, Z=50 Ω, $R_A$=0.1 Ω, $C_A$=100 nF and $T_1$=$T_2$=1 ns.

FIG. 6 shows the results of a computer simulation with a rather modest voltage across $C_G$ of 200 kV and a small value for $R_G$ of 0.1 Ohm. The available power 72 approaches 4 GW in the delay line. Despite the small parameter values, computer simulations indicate that when the charging voltage V applied to $C_G$ increases, the power available is proportional to $V^2$ if all other parameters remain constant. A voltage of 200 kV, as assumed in the calculations, is a rather conservative number since the experiments performed with an exploding wire, a helical inductance of 50 µH and a 1.3 kA current produces a voltage of 800 kV. This amplitude is more than 10 times larger in comparison to the voltage applied to prime the helix, showing excellent conversion efficiency.

FIG. 7A shows computer simulations of the available power and its FFT with conditions as for FIG. 5, but with a $C_A$ of 10 nF. A decrease in the value of $C_A$ by an order of magnitude does not affect the available power in the circuit. If the delay lines are capacitively coupling, as represented by the capacitance of 100 pF used to generate the results of FIG. 7B, the frequency of oscillation will decrease and the frequency response will split into two peaks. These two peaks 84 and 86 shown in the FFT of FIG. 7B are at 120 and 131 MHz respectively. Similarly, the low frequency component will also have two peaks 86 at 6.3 and 14.89 MHz.

The size of the primary antenna 66 in FIG. 3 also dictates the radiation output at low frequencies. When the size increases, the peak power rises and the duration of the signal decreases. Table 1 gives data for antennas with semi-spherical domes of varying dimensions. The power W is found by multiplying the signal by itself, and integrating the relative value of the energy radiated. The efficiency of the system can be determined by comparing W to the energy stored in the impulse generator. FIG. 10 shows the absolute value of W versus the dome length over wavelength.

TABLE 1

| Frame | W (nV²s) | Dome Length (cm) | Dome Diameter (cm) |
|---|---|---|---|
| A | 71.5 | 8.8 cm attached to Disk of 32 cm radius | 10.8 |
| B | 12.3 | 28.8 | 10.8 |
| C | 8.4 | 15.5 | 10.8 |
| D | 8.3 | 8.8 | 10.8 |

It was experimentally determined that the radiation output is optimized when the antenna resembles a spider-like structure consisting of 12 cylinders, 57 cm in length and 5 mm in diameter. This antenna was used to generate FIGS. 7 and 8.

For the MCG in a high velocity flight, the bow-shaped shockwave will be set around point 90 in FIG. 2 and this wave resembles a spider-like optimum antenna structure. If the MCG is in a stationary position, the antenna/trap 62 shown in FIG. 3 corresponds to the vortex wake, while the primary antenna 66 corresponds to the bow-shaped shockwave. The physical dimensions of $C_A$ can also act as an antenna.

The helix can behave as a solid line for a 44 MHz frequency, as shown by the following experiments.

Experiment 1

The helix was wound on a plexiglass tube with a 7.5 cm diameter and 35 cm length at a rate of 7 turns per 10 cm. The diameter of the inner conducting tube was 5 cm. The separation between the turns was 4.5 mm and the cross-section of the copper wire used was 3.1 mm*0.75 mm. The helix was energized by the impulse generator with $C_G$=1.14 nF and $C_A$ charged to V=112 kV.

In accordance with the teachings of the co-pending application (by M. M. Kekez and D. D. Kekez, "Radio Frequency Pulse Generating Apparatus") the antennas/λ/4 trap were set for a frequency emission of 44 MHz. An additional antenna (66 in FIG. 3) acts as the capacitive load Its size was optimized until the output radiation reached a maximum value.

For a voltage above 70 kV, visible corona type electrical discharges between the turns of the helix were observed. These discharges produced oscillations in the current waveform, as shown in FIG. 8, Frame A. On the whole, the helix behaves rather like a conventional choke capable of slowly dissipating the energy from the impulse generator. The radiation signals measured by a D-dot probe are shown in FIG. 8, frame B and its FFT in frame C. A comparison of the traces in frame B indicates that the main component of the radiation is at 44 MHz. The power radiated is 26 MW and the total energy of the radiation is 0.45 J, while the impulse (seven-stage Marx) generator has supplied 7.17 J.

Experiment 2

Keeping the experimental conditions of FIG. 8, FIG. 9 was obtained by converting the corona discharges into spark discharges. There are many methods of forcing the corona discharges to be transformed into the single spark channel that bridges the turns of a helix in the slot assumed present in FIG. 2. One method is to remove or weaken the insulation at the point where the spark channel occurs. Alternatively, the separation between turns can be decreased by flattening the wire at the points resting in the longitudinal direction in the slot of the helix.

For the experimental conditions of FIG. 8, the power radiated was seen to rise to 35 MW at the same frequency of 44 MHz. For a pulse duration of 60 ns, the total energy of the radiation is 2.8 J. This represents a six-fold increase in the emitted energy over the configuration of Experiment 1. The energy stored in the impulse generator remained the same (7.17 J.). An FFT of the signal 78 shows two frequency peaks: 44 and 306 MHz with the latter value governed by Eq. (4).

The improved performance is due to a thermalization process between electrons and ions, caused by the spark channel plasma. The electrical conductivity of the plasma is high and the spark channels behave as solid conductors that are short-circuiting the turns of the helix. The radiations emitted during the formations of the spark channels are not considered important in this invention.

The foregoing has described the present invention. It will be understood that a person skilled in the art can deviate from the exact structure as described herein without departing from the spirit of the invention.

What is claimed is:

1. An explosively driven Radio Frequency (RF) pulse-generating device, said device comprising
    a Magneto-Cumulative Generator (MCG), having a helix and an end cap; and
    a capacitor having first and second leads, said first lead connecting said capacitor to said end cap and said second lead connecting said capacitor to the final turn of said helix;
    whereby said device comprises an oscillatory circuit which generates a high frequency RF pulse; detonation of said MCG producing hydrocarbon byproducts that form a vortex wake; said vortex wake forming an antenna with a conical-shaped structure and emitting said RF pulse.

2. The device of claim 1 wherein the helical MCG is a medium-size device containing 0.5 to 2 kg of high energy explosive and generating a RF pulse of 10–40 kJ.

3. The device of claim 1 wherein the helical MCG is a small-size device containing 10 to 60 g of high energy explosive.

4. The device of claim 1 wherein a low-ionization material is added in the form of a slab to prolong the lifetime of the vortex wake.

5. An explosively driven Radio Frequency (RF) pulse-generating device, said device comprising a Helical Magneto-Cumulative Generator (MCG), detonation of said MCG producing hydrocarbon byproducts that form a vortex wake, said vortex wake forming an antenna with a conical-shaped structure, said vortex wake emitting an RE pulse at a tail end of the MCG and, upon flight, bow-shaped shockwaves create an RF pulse at a head end of the MCG, whereby said head end is at an opposite end of the MCG to said tail end.

6. An assembly of two devices as set out in claim 5 wherein the two devices are placed head-to-head so that, without flight, two vortex wakes emit in opposite directions.

7. The device in claim 6 wherein the two devices are ignited at approximately the same instant.

8. The device of claim 7 wherein the helical MCG is a medium-size device containing 0.5 to 2 kg of high energy explosive and generating a RF pulse of 10–40 kJ.

9. The device of claim 7 wherein the helical MCG is a small-size device containing 10 to 60 g of high energy explosive.

10. The device of claim 9 wherein a low-ionization material is added in the form of a slab to prolong the lifetime of the vortex wake.

* * * * *